US010421893B2

(12) United States Patent
Vo et al.

(10) Patent No.: US 10,421,893 B2
(45) Date of Patent: Sep. 24, 2019

(54) ENCAPSULATED SCALE INHIBITOR FOR DOWNHOLE APPLICATIONS IN SUBTERRANEAN FORMATIONS

(71) Applicant: Halliburton Energy Services, Inc., Houston, TX (US)

(72) Inventors: Loan K. Vo, Houston, TX (US); Christopher Parton, Humble, TX (US); Christopher A. Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/760,087

(22) PCT Filed: Nov. 4, 2015

(86) PCT No.: PCT/US2015/059042
§ 371 (c)(1),
(2) Date: Mar. 14, 2018

(87) PCT Pub. No.: WO2017/078703
PCT Pub. Date: May 11, 2017

(65) Prior Publication Data
US 2018/0265765 A1    Sep. 20, 2018

(51) Int. Cl.
*E21B 37/06* (2006.01)
*E21B 43/267* (2006.01)
(Continued)

(52) U.S. Cl.
CPC ............... *C09K 8/52* (2013.01); *C09K 8/80* (2013.01); *E21B 43/267* (2013.01); *C09K 8/50* (2013.01);
(Continued)

(58) Field of Classification Search
CPC ........ E21B 43/267; E21B 37/06; E21B 43/26; E21B 37/00; E21B 41/02; C09K 8/80;
(Continued)

(56) References Cited

U.S. PATENT DOCUMENTS 8,138,129 B2    3/2012    Welton
8,211,836 B2    7/2012    Ke et al.
(Continued)

FOREIGN PATENT DOCUMENTS

WO    2012/012224 A1    1/2012

OTHER PUBLICATIONS

International Preliminary Report on Patentability in related PCT application No. PCT/US2015/059042 dated May 17, 2018, 12 pages.
(Continued)

*Primary Examiner* — Zakiya W Bates
(74) *Attorney, Agent, or Firm* — Thomas Rooney; Baker Botts L.L.P.

(57) ABSTRACT

An encapsulated scale inhibitor comprises: at least one scale inhibitor, wherein the at least one scale inhibitor is in the form of particulates; and an encapsulating material, wherein the encapsulating material at least partially encapsulates the at least one scale inhibitor, wherein the encapsulated scale inhibitor is capable of complete degradation. In one embodiment, a method comprises: providing a treatment fluid comprising a plurality of scale inhibitor particulates that comprise at least one scale inhibitor and a self-degrading encapsulating material that at least partially encapsulates the scale inhibitor; and introducing the treatment fluid into a well bore penetrating at least a portion of the subterranean formation.

20 Claims, 2 Drawing Sheets

(51) Int. Cl.
*C09K 8/80* (2006.01)
*C09K 8/52* (2006.01)
C09K 8/50 (2006.01)
C09K 8/62 (2006.01)

(52) U.S. Cl.
CPC ............ *C09K 8/62* (2013.01); *C09K 2208/04* (2013.01); *C09K 2208/20* (2013.01); *C09K 2208/22* (2013.01)

(58) Field of Classification Search
CPC ........ C09K 8/805; C09K 8/536; C09K 8/528; C09K 2208/20; C09K 2208/26; C09K 2208/32
See application file for complete search history.

(56) References Cited

U.S. PATENT DOCUMENTS

| | | |
|---|---|---|
| 2005/0194135 A1 | 9/2005 | Nguyen et al. |
| 2006/0124301 A1 | 6/2006 | Gupta et al. |
| 2006/0162928 A1 | 7/2006 | Collins et al. |
| 2009/0038799 A1 | 2/2009 | Garcia-Lopez de Victoria et al. |
| 2011/0168395 A1 | 7/2011 | Welton et al. |
| 2014/0262247 A1 | 9/2014 | Duenckel et al. |

OTHER PUBLICATIONS

International Search Report and Written Opinion issued in related PCT Application No. PCT/US2015/059042 dated Jul. 28, 2016, 16 pages.

ENCAPSULATED SCALE INHIBITOR FOR DOWNHOLE APPLICATIONS IN SUBTERRANEAN FORMATIONS

CROSS-REFERENCE TO RELATED APPLICATION

The present application is a U.S. National Stage Application of International Application No. PCT/US2015/059042 filed Nov. 4, 2015, which is incorporated herein by reference in its entirety for all purposes.

BACKGROUND

The present disclosure relates to methods and compositions for treating subterranean formations.

In hydrocarbon exploration and production, a variety of treatment chemicals, including scale inhibitors, may be used to facilitate the production of the hydrocarbons from subterranean formations. However, many treatment chemicals may be affected by exposure to the well bore environment before the chemicals reach their desired destinations in the subterranean formation. This can result in the reaction of the treatment chemical within the well bore, which, depending on the treatment chemical, could impact the production potential of the well. The effectiveness of the treatment chemical may be reduced if released or consumed prematurely.

In some cases, treatment chemicals, such as scale inhibitors, may be encapsulated in a polymeric material. However, such polymeric materials used to encapsulate the scale inhibitors may not be degradable and thus may remain in the subterranean formation, which can result in formation damage and/or connectivity issues. Therefore, additional steps may be needed to remove the encapsulating materials that remain in the wellbore after the scale inhibitor has reacted.

BRIEF DESCRIPTION OF THE DRAWINGS

These drawings illustrate certain aspects of some of the embodiments of the present disclosure, and should not be used to limit or define the claims.

Figure 1:
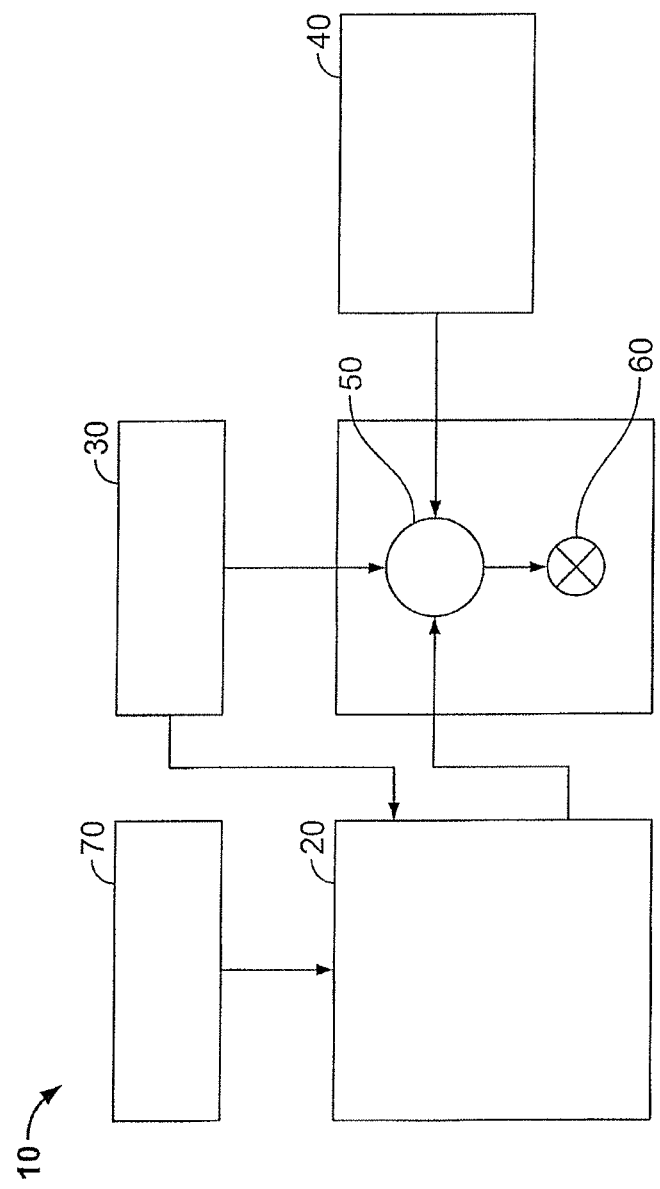
FIG. 1 is a diagram illustrating an example of a fracturing system that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to methods and compositions for treating subterranean formations. More particularly, the present disclosure relates to encapsulated scale inhibitors and methods of their use in subterranean formations.

In certain embodiments, the encapsulated scale inhibitors of the present disclosure may comprise at least one scale inhibitor and an encapsulating material that at least partially encapsulates the scale inhibitor. As used herein, the term "encapsulates" and variants thereof may refer to the ability of the encapsulating material to embed, encase, coat, cover, become intertwined with, and/or the like, the scale inhibitor. In certain embodiments, the scale inhibitor particulates of the present disclosure may be provided or used as a component of a treatment fluid. In certain embodiments, the treatment fluid comprising the scale inhibitor particulates of the present disclosure may be introduced into a well bore penetrating at least a portion of the subterranean formation.

Among the many potential advantages to the methods and compositions of the present disclosure, only some of which are alluded to herein, the methods and compositions of the present disclosure may, among other benefits, provide for the controlled release of one or more scale inhibitors in subterranean treatment operations. In some embodiments, a controlled release may be provided, among other reasons, to maintain certain concentration levels of a scale inhibitor in a fluid over a certain period of time. As used herein, "controlled release" and variations of that phrase may refer to the ability of a scale inhibitor particulate of the present disclosure to maintain a certain rate at which the scale inhibitor in is released, e.g., by diffusing into fluids in contact the scale inhibitor. In certain embodiments, the scale inhibitor particulates of the present disclosure may target a controlled release of the scale inhibitor over a period of time of about 0.5 hours to about 24 hours or more at temperature and pressure conditions in a subterranean formation.

In certain embodiments, the encapsulating materials of the present disclosure may completely self-degrade. As used herein, "self-degrade" and variants of that phrase may refer to the ability of an encapsulating material of the present disclosure to degrade over time under the ambient subterranean formation conditions or with exposure to substances in the subterranean formation (e.g., aqueous fluids) without the need for chemical treatments or like to trigger and/or aid in the degradation. In certain embodiments, the scale inhibitors of the present disclosure may be completely consumed. As used herein, "consumed" and variations of that phrase may refer to degraded, dissolved, reacted, and/or otherwise released into the subterranean formation. The complete degradation and/or consumption of the components of the scale inhibitor particulates of the present disclosure, including the encapsulating material and the scale inhibitor, may avoid potential formation damage and/or connectivity issues that might otherwise result from a non-degradable encapsulating material remaining in the subterranean formation. In some embodiments, the encapsulating material of the scale inhibitor particulates of the present disclosure may also release acid upon degradation which may, for example, stimulate the subterranean formation to increase hydrocarbon production, break a fracturing fluid in the subterranean formation, and/or enhance connectivity between pore spaces within the subterranean formation.

The scale inhibitors used in the scale inhibitor particulates of the present disclosure may comprise any material known in the art suitable for inhibiting the formation of scale within a subterranean formation. Examples of materials that may be used as scale inhibitors in the scale inhibitor particulates of the present disclosure include, but are not limited to, polyphosphates, polyphosphonates, polysulfonates, molecules with chelating capabilities, such as ethylenediaminetetraacetic acid (EDTA), tri-sodium salt of methylglycinediacetic acid (MGDA), and the like, and any derivatives and/or combinations thereof. One example of a commercially available scale inhibitor that may be suitable for use in certain embodiments of the present disclosure is Scalechek® LP-65, available from Halliburton Energy Services, Inc., Houston, Tex. The scale inhibitors used in the scale inhibitor particulates of the present disclosure may be liquid or solid.

In some embodiments, the scale inhibitor may be bound to a substrate, that is then encapsulated with the encapsulating material. For example, a liquid scale inhibitor may be bound to or adsorbed onto a solid substrate. The substrates that may be suitable for use in the scale inhibitor particulates of the present disclosure may be any material known in the art to which a scale inhibitor may be bound, including, but not limited to, rock salt and ground or crushed shells of nuts (e.g., walnut, coconut, pecan, peanut, almond, ivory nut, brazil nut). In certain embodiments, substrate may also be self-degradable (e.g., rock salt).

The encapsulating materials used in the scale inhibitor particulates of the present disclosure may comprise any materials known in the art suitable for embedding, encasing, coating, covering, becoming intertwined with, and the like the scale inhibitor, including but not limited to, polymeric materials. Examples of encapsulating materials that may be used to form coatings in the scale inhibitor particulates of the present disclosure include, but are not limited to, degradable polymers, such as polylactide polymers, such as polylactide (PLA), polyester-based polymers, such as polycaprolactone (PCL), polyglycolic polymers, and any derivatives and/or combinations thereof. One example of a commercially available encapsulating material that may be suitable for use in certain embodiments of the present disclosure is BioVert® NWB, available from Halliburton Energy Services, Inc., Houston, Tex.

The encapsulating material may be of any thickness appropriate for a particular application of the present disclosure, which a person of skill in the art with the benefit of this disclosure will recognize. The amount of encapsulation and/or the porosity of the encapsulating material may dictate the rate at which the scale inhibitor is released into the subterranean formation. In certain embodiments, the encapsulating material may encapsulate from about 40% to about 100% of the scale inhibitor. In some embodiments, the encapsulating material may encapsulate from about 40% to about 50% of the scale inhibitor, in other embodiments, from about 50% to about 60%, in other embodiments, from about 60% to about 70%, in other embodiments, from about 70% to about 80%, in other embodiments, from about 80% to about 90%, and in other embodiments from about 90% to about 100%.

In certain embodiments, the size of the scale inhibitor particulates of the present disclosure may be from about 0.05 mm to about 2.5 mm. In some embodiments, the size of the scale inhibitor particulates of the present disclosure may be from about 0.05 mm to about 0.5 mm, in other embodiments, from about 0.5 mm to about 1 mm, in other embodiments, from about 1 mm to about 1.5 mm, in other embodiments, from about 1.5 mm to about 2 mm, and in other embodiments, from about 2 mm to about 2.5 mm.

In certain embodiments, the scale inhibitor particulates of the present disclosure may be mixed with a treatment fluid. The treatment fluids used in the methods and compositions of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods of the present disclosure may comprise water from any source. Such aqueous fluids may comprise fresh water, salt water (e.g., water containing one or more salts dissolved therein), brine (e.g., saturated salt water), seawater, or any combination thereof. In certain embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods of the present disclosure include, but are not limited to, oils, hydrocarbons, organic liquids, and the like. In certain embodiments, the fracturing fluids may comprise a mixture of one or more fluids and/or gases, including but not limited to emulsions, foams, and the like.

In certain embodiments, the treatment fluids used in the methods and compositions of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, additional scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after a viscosifying agent has been at least partially hydrated in the fluid. A person skilled in the art, with the benefit of this disclosure, will recognize the types of additives that may be included in the fluids of the present disclosure for a particular application.

In certain embodiments, the scale inhibitor particulates of the present disclosure may be present in the treatment fluid in an amount effective to at least partially inhibit and/or completely prevent the formation of scale in the subterranean formation into which the treatment fluid is introduced. In certain embodiments, the scale inhibitor particulates of the present disclosure may be present in the treatment fluid in an amount from about 0.1 pound per thousand gallons of treatment fluid to about 10 pounds per thousand gallons of treatment fluid. In some embodiments, the scale inhibitor particulates of the present disclosure may be present in the treatment fluid in an amount of about 1 pound per thousand gallons of treatment fluid. In some embodiments, the scale inhibitor particulates of the present disclosure may be present in the treatment fluid in an amount from about 0.1 pound per thousand gallons of treatment fluid to about 1 pound per thousand gallons of treatment fluid, in other embodiments, from about 1 pound per thousand gallons of treatment fluid to about 5 pounds per thousand gallons of treatment fluid, in other embodiments, from about 5 pounds per thousand gallons of treatment fluid to about 10 pounds per thousand gallons of treatment fluid.

The present disclosure in some embodiments provides methods for using the scale inhibitor particulates of the present disclosure in carrying out a variety of subterranean treatments. In certain embodiments, the scale inhibitor particulates may be introduced into a well bore penetrating at least a portion of a subterranean formation. In some embodiments, the scale inhibitor particulates may be introduced directly down hole, for example, into the annulus. In other embodiments, the scale inhibitor particulates may be mixed with a treatment fluid, for example, a fracturing fluid or a pad fluid, and the treatment fluid may then be introduced into a well bore penetrating at least a portion of a subterranean formation. In certain embodiments, the treatment fluid may be a fracturing fluid, a gravel packing fluid, a pre-pad fluid, a pad fluid, a pre-flush fluid, an after-flush fluid, an acidic fluid, a consolidation fluid, a cementing fluid, a well bore clean-out fluid, a conformance fluid, an aqueous fluid, a non-aqueous fluid, a hydrocarbon-based fluid, a foamed fluid, and/or any combinations thereof.

In certain embodiments, the encapsulating material may begin to dissolve, degrade, or otherwise be removed from the surface of the scale inhibitor due to the environment and/or conditions in a subterranean formation (e.g., temperature, pressure, and contact with fluids). In certain embodiments, the encapsulating material may degrade over time under ambient well bore conditions. In certain embodiments, ambient well bore condition may include a temperature from about 100° F. to about 350° F. and a pressure from about 1,000 psi to about 15,000 psi. Once the encapsulating material has at least partially been removed from the surface of the scale inhibitor, the scale inhibitor may interact with components in the subterranean formation, e.g., by diffusing into fluids in contact the scale inhibitor.

In certain embodiments, the encapsulating material may control the release of the scale inhibitor in the subterranean formation. In certain embodiments, the scale inhibitor particulates of the present disclosure may target a controlled release of the scale inhibitor in over a period of time of about 0.5 hours to about 24 hours or more at temperature and pressure conditions in a subterranean formation. In some embodiments, the scale inhibitor particulates of the present disclosure may target a controlled release of the scale inhibitor over a period of time of about 0.5 hours to about 1 hour, in other embodiments, over about 1 hour to about 5 hours, in other embodiments, over about 5 hours to about 12 hours, and in other embodiments, over about 12 hours to about 24 hours.

In certain embodiments, the encapsulating material may release acid as it is removed from the surface of the scale inhibitor. In such embodiments, the released acid, among other benefits, may remove scale that has formed on the surface of subterranean formation inside the well bore and/or on the surface of equipment located in the well bore, stimulate the subterranean formation to increase hydrocarbon production, break a fracturing fluid in the subterranean formation, and/or enhance connectivity between pore spaces within the subterranean formation. In certain embodiments, the components of the scale inhibitor particulates of the present disclosure, including both the encapsulating material and the scale inhibitor, may completely degrade and/or be consumed such that no residue is left behind in the subterranean formation. This may reduce and/or eliminate the need for additional treatments to remove the encapsulating material.

The present disclosure in some embodiments provides methods for using the treatment fluids to carry out a variety of subterranean treatments, including but not limited to, hydraulic fracturing treatments, acidizing treatments, squeeze treatments, and drilling operations. In some embodiments, the treatment fluids of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing). In certain embodiments, the treatment fluid may be introduced into a subterranean formation using the application of pump pressure to force the treatment fluid into a preselected and/or targeted treatment zone of the subterranean formation (e.g., squeeze treatment). In some embodiments, the pump pressure may be below that of the formation fracture pressure.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. In certain embodiments, one or more scale inhibitor particulates of the present disclosure may be provided in the proppant source 40 and thereby combined with the fracturing fluid with the proppant. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions. In certain embodiments, the other additives 70 may include one or more scale inhibitor particulates of the present disclosure.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppant particles, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppant particles at other times, and combinations of those components at yet other times.

Figure 2:
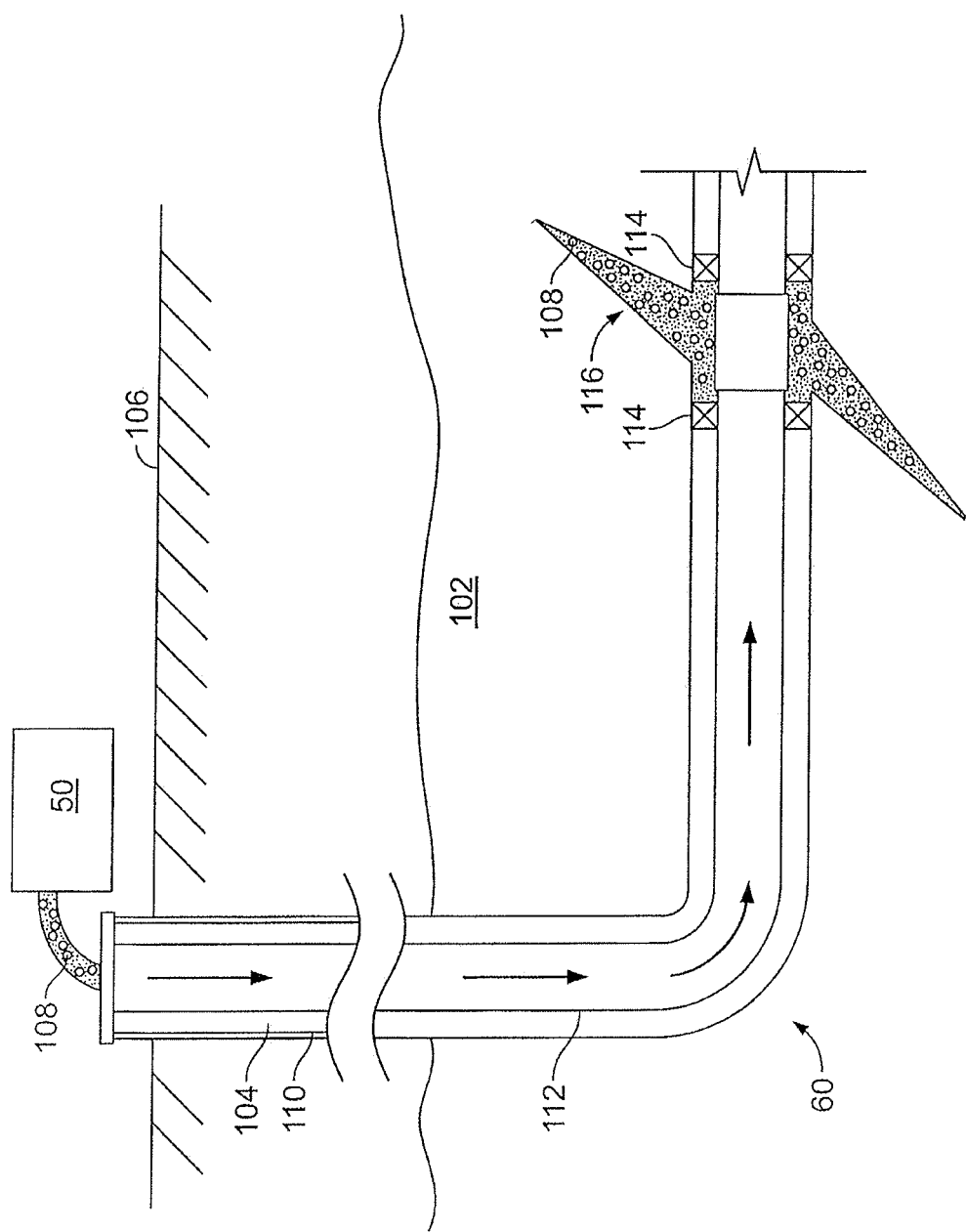
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates (and/or scale inhibitor particulates of the present disclosure) in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

To facilitate a better understanding of the present disclosure, the following example of certain aspects of certain embodiments are given. The following examples are not the only examples that could be given according to the present disclosure and are not intended to limit the scope of the disclosure or claims.

EXAMPLE

The following example demonstrates the slow release of a phosphorous-containing scale inhibitor over time. Three sample scale inhibitor particulates of the present disclosure were prepared by mixing a phosphorous containing scale inhibitor, Scalechek® LP-65, into a matrix of an encapsulating material, BioVert® NWB, which was solublized in chloroform. Sample 1, Sample 2, and Sample 3 contained 0.1 mL, 0.5 mL, and 1 mL of the scale inhibitor, respectively. Sample 1 and Sample 2 each contained 25 grams of the encapsulating material while Sample 3 contained 3 grams of the encapsulating material. The mixtures were dried to remove all of the chloroform solvent. The dried mixtures were cut into small pieces to form scale inhibitor particulates which were then exposed to 75 mL of water. Aliquots of the water samples containing the scale inhibitor particulates were drawn over time and the phosphorous content of each aliquot was determined as an indication of the amount of scale inhibitor released over time. As shown in Table 1, the phosphorous content of the water slowly increased over time in each of the samples.

TABLE 1

| | Phosphorous Content (ppm) | | |
|---|---|---|---|
| Time | Sample 1 | Sample 2 | Sample 3 |
| 0 hour | — | 0.68 | 19 |
| 3 hours | 0.03 | 18.75 | 65 |
| 8 hours | 1.49 | 22.11 | 908 |
| 24 hours | 1.57 | 55.57 | 1246 |
| 28 hours | 2.74 | 90.00 | 1900 |

Thus, Example 1 demonstrates that the method of the present disclosure may provide, among other benefits, for the controlled release of one or more scale inhibitors in subterranean treatment operations.

An embodiment of the present disclosure is a method comprising: providing a treatment fluid comprising a plurality of scale inhibitor particulates that comprise at least one scale inhibitor and a self-degrading encapsulating material that at least partially encapsulates the scale inhibitor; and introducing the treatment fluid into a well bore penetrating at least a portion of the subterranean formation.

Another embodiment of the present disclosure is a method comprising: providing a treatment fluid comprising a plurality of scale inhibitor particulates that comprise at least one scale inhibitor and an encapsulating material that at least partially encapsulates the scale inhibitor, wherein the encapsulating material comprises a polylactide polymer; and introducing the treatment fluid into a well bore penetrating at least a portion of the subterranean formation.

Another embodiment of the present disclosure is a method comprising: providing a treatment fluid comprising a plurality of scale inhibitor particulates that comprise at least one scale inhibitor and a self-degrading encapsulating material that at least partially encapsulates the scale inhibitor, wherein the encapsulating material comprises a polylactide polymer; and introducing the treatment fluid into a well bore penetrating at least a portion of the subterranean formation, wherein the treatment fluid is a fracturing fluid and wherein the fracturing fluid is introduced into the well bore at or above a pressure sufficient to create or enhance at least one fracture in the portion of the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a treatment fluid comprising a plurality of encapsulated scale inhibitor particulates, wherein each one of the plurality of encapsulated scale inhibitor particulates comprises at least one scale inhibitor and a self-degrading encapsulating material that at least partially encapsulates the scale inhibitor; and
introducing the treatment fluid into a well bore penetrating at least a portion of the subterranean formation, wherein substantially all of the plurality of encapsulated scale inhibitor particulates completely degrade in the subterranean formation.

2. The method of claim 1 further comprising:
allowing the self-degrading encapsulating material to at least partially degrade over time thereby controlling the release of the scale inhibitor into the subterranean formation.

3. The method of claim 1 wherein the scale inhibitor is released over a period of time of about 0.5 hours to about 24 hours.

4. The method of claim 1 wherein the self-degrading encapsulating material degrades over time under ambient well bore conditions to release the scale inhibitor into the subterranean formation.

5. The method of claim 1 wherein the encapsulating material encapsulates from about 40% to about 100% of the scale inhibitor.

6. The method of claim 1 wherein the scale inhibitor is selected from the group consisting of: a polyphosphate, a polyphosphonate, a polysulfonate, ethylenediaminetetraacetic acid (EDTA), tri-sodium salt of methylglycinediacetic acid (MGDA), any derivative thereof, and any combination thereof.

7. The method of claim 1 wherein the self-degrading encapsulating material is selected from the group consisting of: a polylactide polymer, a polyester-based polymer, a polyglycolic polymer, any derivative thereof, and any combination thereof.

8. The method of claim 1 wherein the treatment fluid comprises the plurality of encapsulated scale inhibitor particulates in an amount from about 1 pound per thousand gallons of treatment fluid to about 10 pounds per thousand gallons of treatment fluid.

9. The method of claim 1 wherein the treatment fluid is selected from the group consisting of: a fracturing fluid, a gravel packing fluid, a pre-pad fluid, a pad fluid, a pre-flush fluid, an after-flush fluid, an acidic fluid, a consolidation fluid, a cementing fluid, a well bore clean-out fluid, a conformance fluid, an aqueous fluid, a non-aqueous fluid, a hydrocarbon-based fluid, a foamed fluid, and any combination thereof.

10. The method of claim 1 wherein the treatment fluid is introduced into the subterranean formation using one or more pumps.

11. The method of claim 1, wherein the encapsulating material releases acid as it degrades, wherein the acid is configured to remove scale from inside the well bore, stimulate the subterranean formation, break a fracturing fluid, or combinations thereof.

12. A method comprising:
providing a treatment fluid comprising a plurality of encapsulated scale inhibitor particulates, wherein each one of the plurality of encapsulated scale inhibitor particulates comprises at least one scale inhibitor and an encapsulating material that at least partially encapsulates the scale inhibitor, wherein the encapsulating material comprises a polylactide polymer; and
introducing the treatment fluid into a well bore penetrating at least a portion of the subterranean formation, wherein substantially all of the plurality of encapsulated scale inhibitor particulates completely degrade in the subterranean formation.

13. The method of claim 12 wherein the scale inhibitor is selected from the group consisting of: a polyphosphate, a polyphosphonate, a polysulfonate, ethylenediaminetetraacetic acid (EDTA), tri-sodium salt of methylglycinediacetic acid (MGDA), any derivative thereof, and any combination thereof.

14. The method of claim 12 wherein the encapsulating material releases acid as it degrades.

15. The method of claim 12 wherein the encapsulating material encapsulates from about 40% to about 100% of the scale inhibitor.

16. A method comprising:
providing a treatment fluid comprising a plurality of encapsulated scale inhibitor particulates, wherein each one of the plurality of encapsulated scale inhibitor particulates consists of at least one scale inhibitor and a self-degrading encapsulating material that at least partially encapsulates the scale inhibitor; and introducing the treatment fluid into a well bore penetrating at least a portion of the subterranean formation.

17. The method of claim 16, wherein the scale inhibitor is selected from the group consisting of: a polyphosphate, a polyphosphonate, a polysulfonate, ethylenediaminetetraacetic acid (EDTA), tri-sodium salt of methylglycinediacetic acid (MGDA), any derivative thereof, and any combination thereof.

18. The method of claim 16, wherein the self-degrading encapsulating material is selected from the group consisting of: a polylactide polymer, a polyester-based polymer, a polyglycolic polymer, any derivative thereof, and any combination thereof.

19. The method of claim 16, wherein substantially all of the plurality of encapsulated scale inhibitor particulates completely degrade in the subterranean formation.

20. The method of claim 16, wherein the encapsulating material releases acid as it degrades, wherein the acid is configured to remove scale from inside the well bore, stimulate the subterranean formation, break a fracturing fluid, or combinations thereof.

* * * * *